C. P. Coles.
Armor Clad.
No. 53,756. Patented Apr. 3, 1866.
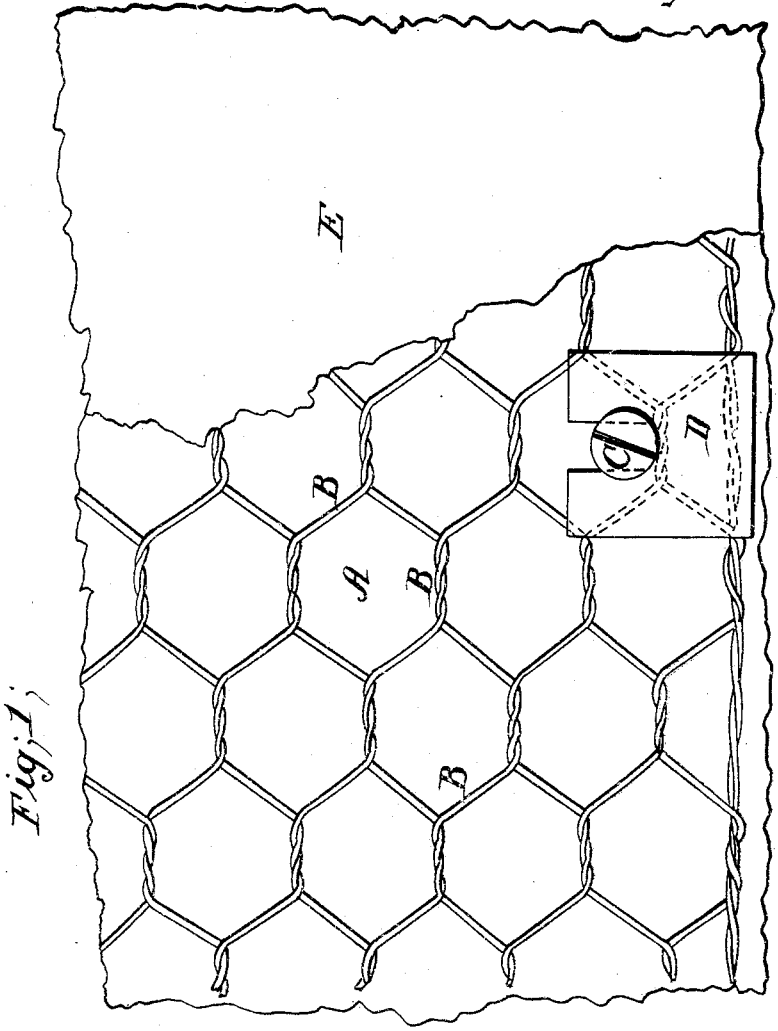
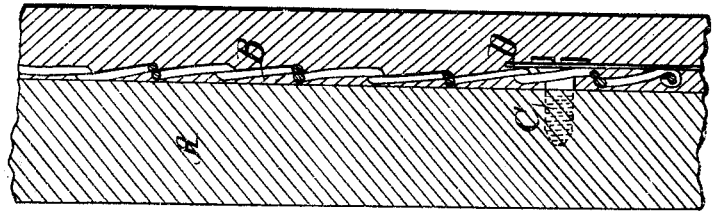
Witnesses;
Jas. J. Wightman
Frederick W. Wurster
Inventor;
Cowper Phipps Coles
by his Attorney
C. L. Kenrick.

UNITED STATES PATENT OFFICE.

COWPER PHIPPS COLES, OF VENTNOR, ENGLAND.

IMPROVED MEANS FOR PROTECTING THE BOTTOMS OF SHIPS.

Specification forming part of Letters Patent No. 53,756, dated April 3, 1866.

*To all whom it may concern:*

Be it known that I, COWPER PHIPPS COLES, of Ventnor, England, captain in the British Navy, have invented Improvements in Protecting the Bottoms and Sides of Wooden and Iron Ships and other Submerged Structures; and I do hereby declare that the following is a full and exact description thereof.

My invention consists in means of affixing to the bottoms and such portions of the sides as are liable to be submerged of iron and wooden ships, caissons, and like structures cements, mortars, stuccos, and concretes, or other like substances. In wooden ships and structures I first drive nails, brads, tacks, eyes, spikes, or other like holding agents into such portions of the structure as are to be protected at about one inch apart, more or less, and having about half an inch protruding. The holding agents can be driven in at an incline, or they may be more or less bent after having been driven in. The cement or other substance or composition is applied after the holding agents have been inserted.

With iron ships and structures I first apply a light sheathing of wood to receive the nails or other holding agents, and I then apply the cement or other like protecting substance or composition; or I sometimes cause studs or roughenings to be rolled or formed on the plating for iron ships and other iron structures, and use these studs or roughenings as the agents for holding the protecting substance or composition; or I fix on a thin metal plate by means of screws tapped into the ship's sides or bottom proper. This plate, before being put on, has flaps cut in it about half an inch square and about one inch or one inch and a half apart. After the plate is on I turn these flaps up at an angle of about forty-five degrees. These flaps or portions of the plate so turned up take the place of studs or nails for holding on the cement or other protecting substances; or I fix on wooden or iron structures, by screws or otherwise, wire-netting or a thin perforated metal plate, or cocoanut matting, canvas, or any other suitable matting or cloth; or thin laths or battens may be fastened to the ship or other structure as holding agents for the cement which is afterward applied thereon.

In order that my invention may be fully understood, I have represented in the accompanying drawings one of the modes in which I have applied it to practical use. This drawing represents a fragment of the bottom of an iron vessel partially coated with cement, Figure 1 being a face view of it, and Fig. 2 being a transverse section of it.

The iron plate A, of which the bottom is formed, is covered, wherever the cement is to be affixed, with a wire-netting, B, which is secured to the iron plate by means of screws C and washers D, which overlap the wires of the netting. These screws and washers are set sufficiently close to each other to hold the cement securely—say about six or eight inches apart, more or less. The netting is not drawn closely to the surface of the iron plate; hence there is space between the plate and the netting for the cement to work into and unite behind the latter. The cement, which in this example is supposed to be the article commonly known as "Portland cement" or "hydraulic cement," is applied in the same manner as plaster is applied to the wall or ceiling of a house. It surrounds the wire-netting and the screw-heads, which are thus embedded in the cement, and it is held securely to the iron plate by the operation of the wire-netting and screws, which in this example constitute the holding agents.

Having thus described the several modes in which I have contemplated the application of the principle or characteristic of my invention, what I claim, and desire to secure by Letters Patent, is—

The combination of the exterior portions of structures that are liable to be submerged with cement by means of holding agents, the whole being combined and operating substantially as set forth.

COWPER P. COLES.

Witnesses:
 I. W. BURGOYNE,
 FRED. W. HERBERT.